(12) United States Patent
Taleb

(10) Patent No.: US 7,356,748 B2
(45) Date of Patent: Apr. 8, 2008

(54) PARTIAL SPECTRAL LOSS CONCEALMENT IN TRANSFORM CODECS

(75) Inventor: Anisse Taleb, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 516 days.

(21) Appl. No.: 11/011,780

(22) Filed: Dec. 15, 2004

(65) Prior Publication Data

US 2005/0163234 A1 Jul. 28, 2005
US 2006/0093048 A9 May 4, 2006

Related U.S. Application Data

(60) Provisional application No. 60/530,653, filed on Dec. 19, 2003.

(51) Int. Cl.
*H04L 1/00* (2006.01)
(52) U.S. Cl. ............... 714/746; 700/94; 704/200.1
(58) Field of Classification Search ............... None
See application file for complete search history.

(56) References Cited

U.S. PATENT DOCUMENTS

| | | | | |
|---|---|---|---|---|
| 5,673,363 A * | 9/1997 | Jeon et al. | | 704/270 |
| 5,752,225 A * | 5/1998 | Fielder | | 704/229 |
| 5,781,888 A * | 7/1998 | Herre | | 704/200.1 |
| 6,351,728 B1 | 2/2002 | Wiese et al. | | |
| 6,418,408 B1 * | 7/2002 | Udaya Bhaskar et al. | .. | 704/219 |
| 6,421,802 B1 | 7/2002 | Schildbach et al. | | |
| 6,597,961 B1 * | 7/2003 | Cooke | | 700/94 |
| 6,904,404 B1 * | 6/2005 | Norimatsu et al. | | 704/222 |
| 7,003,448 B1 * | 2/2006 | Lauber et al. | | 704/200.1 |

OTHER PUBLICATIONS

J. Herre and E. Eberlein; "Evaluation of Concealment Techniques for Compressed Digital Audio;" 94th AES Convention; Oct. 1-4, 1993, preprint 3364.
A. M. Kondoz; "Digital Speech: Coding for Low Bit Rate Communication Systems;" John Wiley & Sons; 1994; pp. 123-128.
J. Laroche and M. Dolson; "Improved Phase Vocoder Time-Scale Modification of Audio;" IEEE Transactions on Speech and Audio Processing, vol. 7, No. 3; May 1999; pp. 323-332.

(Continued)

*Primary Examiner*—Jacques Louis-Jacques
*Assistant Examiner*—Sam Rizk
(74) *Attorney, Agent, or Firm*—Nixon & Vanderhye P.C.

(57) ABSTRACT

The invention concerns a frequency-domain error concealment technique for information that is represented, on a frame-by-frame basis, by coding coefficients. The basic idea is to conceal an erroneous coding coefficient by exploiting coding coefficient correlation in both time and frequency. The technique is applicable to any information, such as audio, video and image data, that is compressed into coding coefficients and transmitted under adverse channel conditions. The error concealment technique proposed by the invention has the clear advantage of exploiting the redundancy of the original information signal in time as well as frequency. For example, this offers the possibility to exploit redundancy between frames (inter-frame) as well as within frames (intra-frame). The use of coding coefficients from the same frame as the erroneous coding coefficient is sometimes referred to as intra-frame coefficient correlation and it is a special case of the more general frequency correlation.

28 Claims, 17 Drawing Sheets

OTHER PUBLICATIONS

Rui Zhang, Shankar Regunathan, and Kenneth Rose; "Optimal Estimation for Error Concealment in Scalable Video Coding;" Oct. 29-Nov. 1, 2000; Signals, Systems and Computers, 2000; Conference Record of the 34th Asilomar Conference.

Song Cen and Pamela Cosman; "Decision Trees for Error Concealment in Video Decoding;" Mar. 2003; Multimedia, IEEE; pp. 1-7.

International Search Report and Written Opinion mailed Apr. 8, 2005 in corresponding PCT Application PCT/SE2004/001868.

Simon J. Godsill and Peter J.W. Rayner; "Digital Audio Restoration—a statistical model based approach;" Springer; Sep. 21, 1998.

J.J.K. O Ruanaidh and William J. Fitzgerald; "Numerical Bayesian Methods Applied to Signal Processing;" Springer; 1996.

Jürgen Herre and Ernst Eberlein; "Error Concealment in the Spectral Domain;" 93rd Convention, Oct. 1-4, 1992; preprint 3364.

* cited by examiner

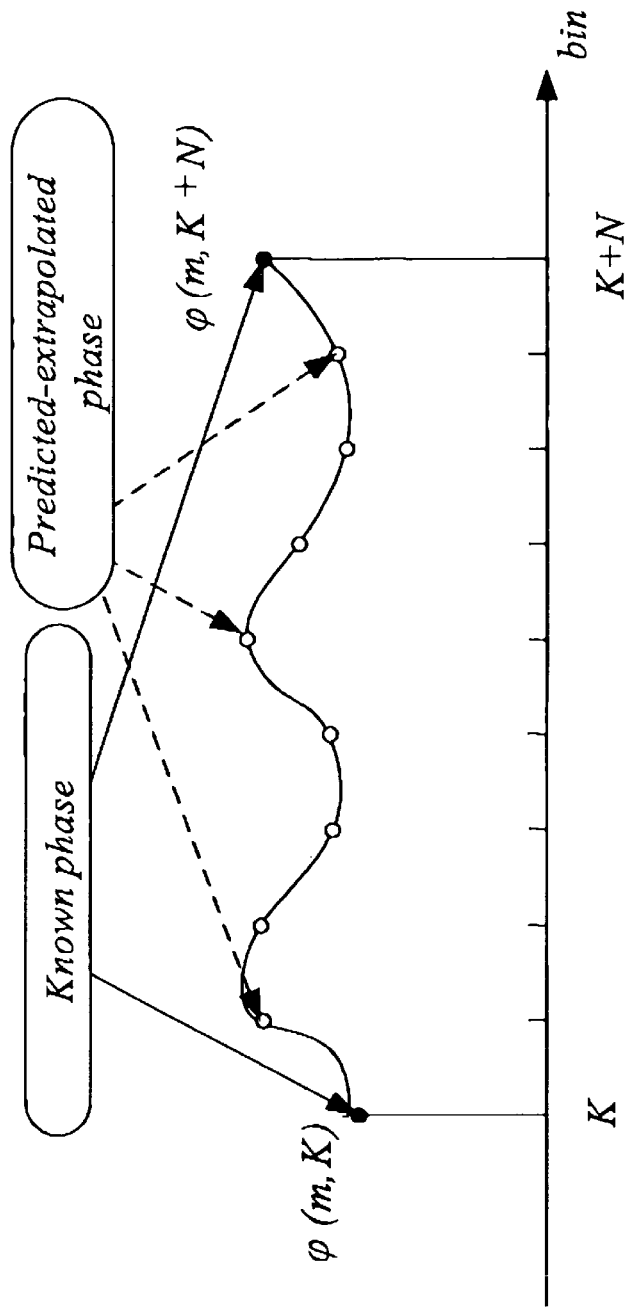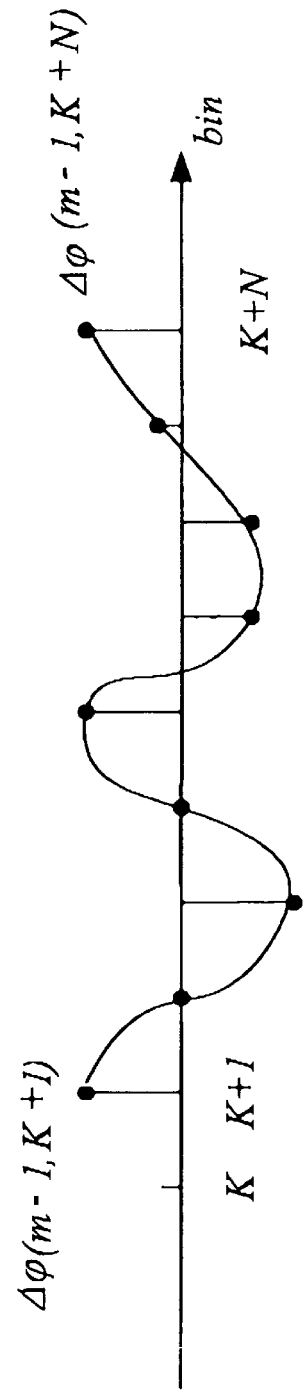
Fig. 9A
Fig. 9B

PARTIAL SPECTRAL LOSS CONCEALMENT IN TRANSFORM CODECS

This application claims priority to and benefit of U.S. Provisional Application No. 60/530,653, filed Dec. 19, 2003 and Swedish Application Number 0400418-0, filed Feb. 20, 2004. The entire contents of these applications are incorporated herein by reference in its entirety.

TECHNICAL FIELD OF THE INVENTION

The present invention generally relates to error concealment, and more particularly to a frequency-domain error concealment technique for use on the decoding side of a codec such as a sub-band codec or transform codec.

BACKGROUND OF THE INVENTION

A media encoder is a device, circuitry or computer program that is capable of analyzing an information stream such as an audio, video or image data stream and outputting an information stream representing the media in an encoded form. The resulting information is often used for transmission, storage and/or encryption purposes. On the other-hand a decoder is a device, circuitry or computer program that is capable of inverting the encoder operation, in that it receives the encoded information stream and outputs a decoded media stream.

In most state-of the art audio and video encoders, each frame of the input signal is analyzed in the frequency domain. The result of this analysis is quantized and encoded and then transmitted or stored depending on the application. At the receiving side, or when using the stored encoded signal, a decoding procedure followed by a synthesis procedure allow to restore the signal in the time domain.

Codecs are often employed for compression/decompression of information such as audio and video data for efficient transmission over bandwidth-limited communication channels.

The most common audio and video codecs are sub-band codecs and transform codecs. A sub-band codec is based around a filter bank, and a transform codec is normally based around a time-to-frequency domain transform as for example the DCT (Discrete Cosine Transform). However, these two types of codecs can be regarded as mathematically equivalent. In a sense they are based on the same principle, where a transform codec can be seen as a sub-band codec with a large number of sub-bands.

A common characteristic of these codecs is that they operate on blocks of samples: frames. The coding coefficients resulting from a transform analysis or a sub-band analysis of each frame are quantized according to a dynamic bit allocation, and may vary from frame to frame. The decoder, upon reception of the bit-stream, computes the bit allocations and decodes the encoded coefficients.

In packet-based communications, the quantized coding coefficients and/or parameters may be grouped in packets. A packet may contain data relevant to several frames, one frame or contain only partial frame data.

Under adverse channel conditions, the encoded/compressed information from the coder may get lost or arrive at the decoding side with errors. In general, transmission of audio, video and other relevant data under adverse channel conditions has become one of the most challenging problems today. In order to alleviate the effect of errors introduced by packet losses or corrupted data during transmission, so-called error concealment is often employed to reduce the degradation of the quality of audio, video or other data represented by the coding coefficients.

Error concealment schemes typically rely on producing a replacement for the quantized coding coefficient(s) of a lost or more generally speaking erroneous packet that is similar to the original. This is possible since information such as audio, and in particular speech, exhibits large amounts of short-term self-similarity. As such, these techniques work optimally for relatively small loss rates (10%) and for small packets (4-40 ms).

A technique known in the field of information transmission over unreliable channels is multiple description coding. The coder generates several different descriptions of the same audio signal and the decoder is able to produce a useful reconstruction of the original audio signal with any subset of the encoded descriptions. This technique assumes the occurrence of an error or a loss independently on each description. This would mean that each description would be transmitted on its own channel or that the descriptions share the same channel but are displaced, in time, with respect to each other. In this case the probability that the decoder receives valid data at each moment is high. The loss of one description can therefore be bridged by the availability of another description of the same signal. The method obviously increases the overall delay between the transmitter and the receiver. Furthermore, either the data rate has to be increased or some quality has to be sacrificed in order to allow the increase in redundancy.

In the case of block or frame oriented transform codecs, the estimation of missing signal intervals can be done in the time domain, i.e. at the output of the decoder, or in the frequency domain, i.e. internally to the decoder.

In the time domain, several error concealment techniques are already known in the prior art. Rudimentary technology as the muting-based methods repair their losses by muting the output signal for as long as the data is erroneous. The erroneous data is replaced by a zero signal. Although very simple, this method leads to very unpleasant effects due to the perceived discontinuities it introduces with sudden falls of the signal energy.

The method of repetition is very similar to the muting technique, but instead of replacing the data by a zero signal when erroneous data occur, it repeats a part of the data that was last received. This method performs better than muting at the expense of an increase of memory consumption. The performance of this method is however limited and some quite annoying artifacts occur. For instance, if the last received frame was a drumbeat, then the latter is repeated which may lead to a double drumbeat where only one drumbeat was expected. Other artifacts may occur if, for instance, the frequency of repetition is short, which introduces a buzzy sound due to a comb filtering effect.

Other more sophisticated techniques aim at interpolating the audio signal by, for example, either waveform substitution, pitch based waveform replication or time scale modification. These techniques perform much better than the previously described rudimentary techniques. However, they require much more complexity. Moreover, the amount of delay that is required to perform the interpolation is, in many cases, unacceptable.

Techniques well known in the literature of audio restoration, e.g. [1], [2], [3], offer useful insights, and in fact deal with similar problems.

Error concealment in the frequency-domain has been considered in [4], [5]. In the case of the DCT (Discrete Cosine Transform) transform, it is found that a simple concealment technique is to clip large DCT coefficients.

In [6], a data substitution approach is employed with a hearing adjusted choice of the spectral energy. More particularly, a pattern is found in the intact audio data prior to the occurrence of erroneous data. When this pattern is found, replacement data is determined based on this pattern.

In [7], a frequency-domain error concealment technique is described. The described technique is quite general and applies to transform coders. It uses prediction in order to restore the lost or erroneous coefficients. The prediction of an erroneous bin/frequency channel coefficient is based on the past coefficients of the same bin/channel, and may thus consider how the phase in a bin/frequency channel evolves over time in an attempt to preserve the so-called horizontal phase coherence. In some cases, this technique may provide quite satisfactory results.

However, the error concealment technique proposed in [7] generally results in a loss of so-called vertical phase coherence, which may lead to frame discontinuities and perceived artifacts.

In [8], Wiese et al describe a technique for error concealment that is based on switching between several masking strategies, which include at least muting a sub-band and repeating or estimating the sub-band.

SUMMARY OF THE INVENTION

The present invention overcomes these and other drawbacks of the prior art arrangements.

It is a general object of the present invention to provide an improved error concealment technique.

It is another object of the invention to provide a frequency-domain error concealment technique that more optimally exploits the redundancy of the original information signal.

Yet another object of the invention is to provide a general and efficient frequency-domain error concealment technique that can be applied to both sub-band and transform codecs.

It is also an object to provide an improved frequency-domain error concealment arrangement, as well as a decoder and a receiver comprising such an error concealment arrangement.

These and other objects are met by the invention as defined by the accompanying patent claims.

The invention concerns a frequency-domain error concealment technique for information that is represented, on a frame-by-frame basis, by coding coefficients. The basic idea is to conceal an erroneous coding coefficient by exploiting coding coefficient correlation in both time and frequency. The technique is applicable to any information, such as audio, video and image data, that is compressed into coding coefficients and transmitted under adverse channel conditions. The error concealment technique proposed by the invention has the clear advantage of to exploiting the redundancy of the original information signal in time as well as frequency. For example, this offers the possibility to exploit redundancy between frames as well as within frames.

There are many possibilities of exploiting time and frequency correlation, including using coding coefficients from the same frame in which the erroneous coding coefficient resided together with coefficients from one or more previous and/or subsequent frames, using several different coefficients from each of a number of previous and/or subsequent frames, or even using diagonal patterns of coding coefficients. It should though be understood that using coding coefficients from one or more subsequent frames generally introduces a delay, which may or may not be acceptable depending on the application.

The use of coding coefficients from the same frame as the erroneous coding coefficient is sometimes referred to as intra-frame coefficient correlation and it is a special case of the more general frequency correlation. Similarly, using coefficients from one or more previous and/or subsequent frames is sometimes referred to as inter-frame correlation, or simply time correlation.

The error concealment according to the invention is preferably performed by estimating a new coding coefficient based on at least one other coding coefficient within the same frame as the erroneous coefficient and at least one coding coefficient of one or more other frames, and replacing the erroneous (typically lost) coding coefficient by the new coding coefficient.

As normal in sub-band and transform codecs, the information may be represented by coding coefficients of a number of frequency bins, either frequency bands or transform frequency components. In a particularly beneficial and practical implementation, when an erroneous coding coefficient is detected for a certain frequency bin in a certain frame, the new coding coefficient of this frequency bin may be estimated at least partly based on at least one coding coefficient of at least one other frequency bin in the same frame, and preferably also based on at least one coding coefficient of the same frequency bin in one or more other frames. It may be advantageous to consider also at least one coding coefficient of at least one other frequency bin in one or more other frames.

A particularly beneficial implementation, which does not introduce any extra delay, is based on estimating an erroneous coefficient not only from previous data of the erroneous or missing bin, but also on current and/or previous data of other bins. This means that both tune and frequency redundancy are exploited. This is especially true for the case of an audio signal that consists of the sum of harmonics whose frequency varies slowly over time. For this very common audio case, the locations of the peaks of the spectrum vary over time. For instance, a peak that is located at frame m−1 would be located elsewhere at frame m. The use of an estimator or predictor exploiting this type of double redundancy is therefore very desirable.

In particular, the present invention also suggests a special technique for estimating a new coding coefficient by predicting a spectral phase component based on approximate group delay matching between frames, using a predetermined approximation criterion. This is preferably performed by first estimating group delay from at least one other frame, and then calculating the spectral phase by at least approximately matching the group delay of the erroneous spectral component to the estimated group delay.

A spectral amplitude component can be predicted based on matching the energy of spectral coefficients of the considered frame with the energy of corresponding spectral coefficients of at least one other frame.

In the case of transform coding, when the coding coefficients are complex spectral transform coefficients, a new complex spectral coding coefficient of a certain frequency bin is preferably estimated by predicting spectral amplitude and phase separately and subsequently combining the predicted spectral amplitude and phase into a new complex spectral coding coefficient. The spectral energy matching and group delay matching can then be used for individually predicting the spectral amplitude component and spectral phase component, respectively, of the complex coding coefficient.

It should be understood that an erroneous coding coefficient may be a partially erroneous coefficient or a totally lost coding coefficient. In more advanced error detection protocols, it may be possible to distinguish errors in the least significant bits from errors in the most significant bits of a coding coefficient, and in this way re-use at least parts of the information.

The invention offers the following advantages;
Improved error concealment;
Optimal exploitation of the redundancy of the original information signal;
Generally applicable to any sub-band or transform codec application.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which;

FIGS. 9A-B are schematic diagrams illustrating phase extrapolation based on group delay matching.

DETAILED DESCRIPTION OF EMBODIMENTS OF THE INVENTION

Figure 1:
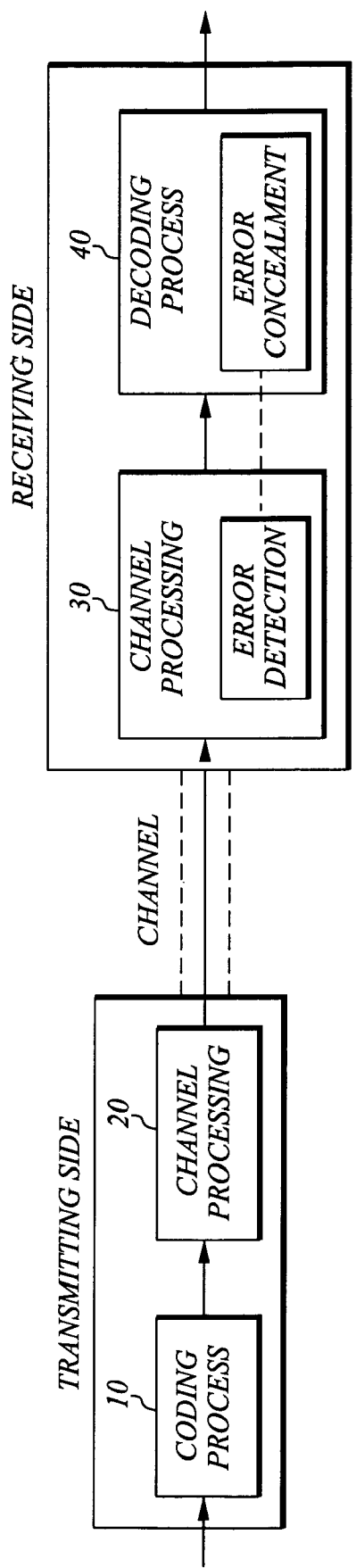
FIG. 1 is a schematic overview of a conventional source coding application.

Throughout the drawings, the same reference characters will be used for corresponding or similar elements.

For a better understanding of the invention, it may be useful to begin with a brief overview of a common source coding application that involves transmission of encoded information over a communication channel. As mentioned earlier, a codec is a composite device, circuitry or computer program capable of processing an information stream, and it generally comprises an encoding part and a decoding part. Codecs are often employed for compression/decompression of information such as audio and video data for efficient transmission over bandwidth-limited communication channels.

In most state-of the art audio and video codecs, each frame of the input signal is analyzed in the frequency domain. The result of this analysis is encoded and then transmitted. At the receiving side, a synthesis procedure restores the signal in the time domain.

The basic concept in frequency domain coding is to divide the spectrum into frequency bands or components, commonly denoted frequency bins, using either a filter bank or a block transform analysis. After encoding and decoding, these frequency bins can be used to re-synthesize a replica of the input signal by either filter bank summation or an inverse transform.

Two well-known types of codecs that belong to the class of frequency domain codecs are sub-band codecs and transform codecs. The basic principle in both types of codecs is the division of the spectrum into frequency bins. In sub-band coding, a filter bank is employed to split the input signal into a number of relatively broad frequency bands. In transform coding on the other hand, a block transformation method is employed to provide a much finer frequency resolution.

A common characteristic of these codecs is that they operate on blocks of samples: frames. The coding coefficients resulting from a transform analysis or a sub-band analysis of each frame are quantized, encoded and transmitted. On the receiving side, the encoded and quantized coding coefficients are decoded to restore the original information.

With reference to FIG. 1, the coder 10 executes an encoding process for transforming the information stream into encoded form, typically as quantized and encoded coding coefficients. The encoded information is then forwarded to a channel-processing block 20 to put the encoded information in suitable form for transmission over the communication channel. On the receiver side, the incoming bit stream is normally processed by the channel-processing block 30, which may perform demultiplexation and error detection. In packet-based communication for example, the packets may be checked for bit errors by performing CRC (Cyclic Redundancy Check) checks or equivalent error detection. Often, packets with incorrect checksums are simply discarded. In order to alleviate the effect of errors introduced into the packets during transmission, an error concealment block is often employed in the decoding process of block 40 for concealing erroneous or missing coding coefficients by estimating new replacement coefficients. The decoding block 40 then executes a synthesis process on the non-erroneous coefficients and the estimated replacement coefficients to restore the original information.

The invention concerns a specially designed technique for frequency-domain error concealment that is based on the idea of concealing an erroneous coding coefficient by exploiting coding coefficient correlation in both time and frequency. The technique is applicable to any information, such as audio, video and image data, that is compressed into coding coefficients and transmitted under adverse channel conditions. The error concealment technique proposed by the invention exploits the redundancy of the information signal in time and frequency, and offers the possibility to exploit redundancy between frames as well as within frames.

There are many possibilities of exploiting the time and frequency correlation/dependency of the coding coefficients. In order to estimate a new coding coefficient to be used instead of an erroneous or lost coefficient, it is desirable to analyze and determine how phase and/or amplitude evolves over time (between frames) and also how the phase and/or amplitude evolves with respect to frequency. This is sometimes also referred to as horizontal correlation/dependency and vertical correlation/dependency, respectively.

For example, for a given erroneous coefficient it is possible to estimate a new coding coefficient based on coding coefficients from the same frame as the erroneous coding coefficient together with coefficients from one or more previous and/or subsequent frames. Another possibility is to use multiple coefficients from each of a number of previous and/or subsequent frames. Diagonal patterns of coefficient dependency in time and frequency can also be exploited.

It should though be understood that using coding coefficients from one or more subsequent frames generally introduces a delay, which may or may not be acceptable depending on the application. In general, it is of course possible to use not only non-erroneous coding coefficients, but also previously estimated replacement coefficients.

FIGS. 2A-2H are schematic diagrams illustrating various exemplary cases of exploiting both time and frequency correlation of coding coefficients. It should be understood that many other variations are possible, depending on design choice, desired computational complexity and so forth.

Figure 2A:
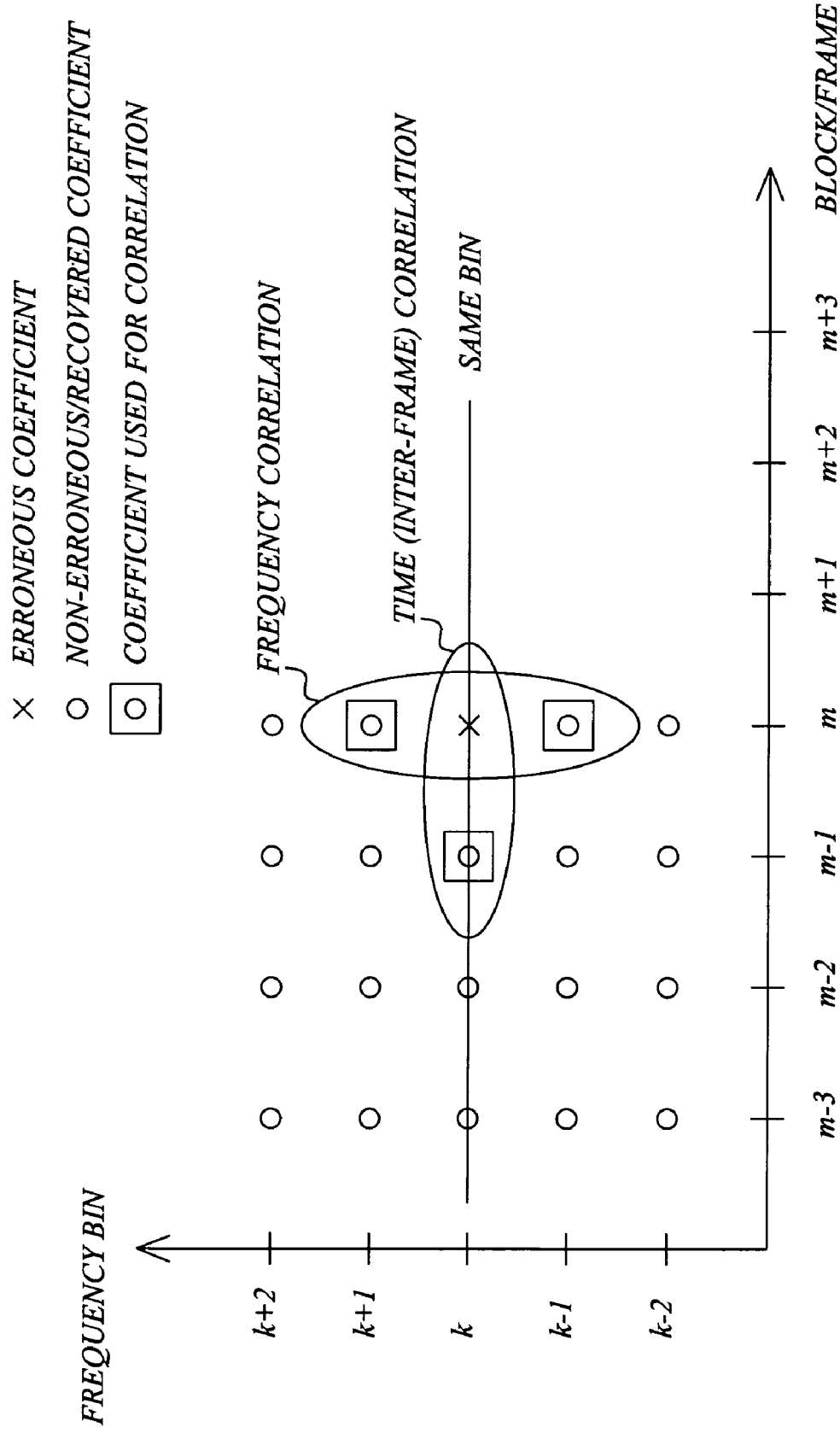
FIGS. 2A-H are schematic diagrams illustrating various exemplary cases of exploiting both time and frequency correlation of coding coefficients.

In the simplified schematic of FIG. 2A it is assumed that an erroneous coding coefficient (indicated by a cross) has been detected for a given frequency bin k in a given block or frame m. FIG. 2A illustrates a basic example in which the considered erroneous coefficient is replaced based on the previous coefficient of the same frequency bin together with the coefficients of two adjacent bins within the same frame as the considered erroneous coefficient. This is a basic example of exploiting coefficient dependency in both time and frequency. The use of coding coefficients from the same frame as the erroneous coding coefficient is sometimes referred to as intra-frame coefficient correlation and it is a special case of the more general frequency correlation. Similarly, using coefficients from one or more previous and/or subsequent frames is referred to as inter-frame correlation or time correlation. The principle of concealing an erroneous coding coefficient based on inter-frame as well as intra-frame coefficient correlation is particularly useful.

Figure 2B:
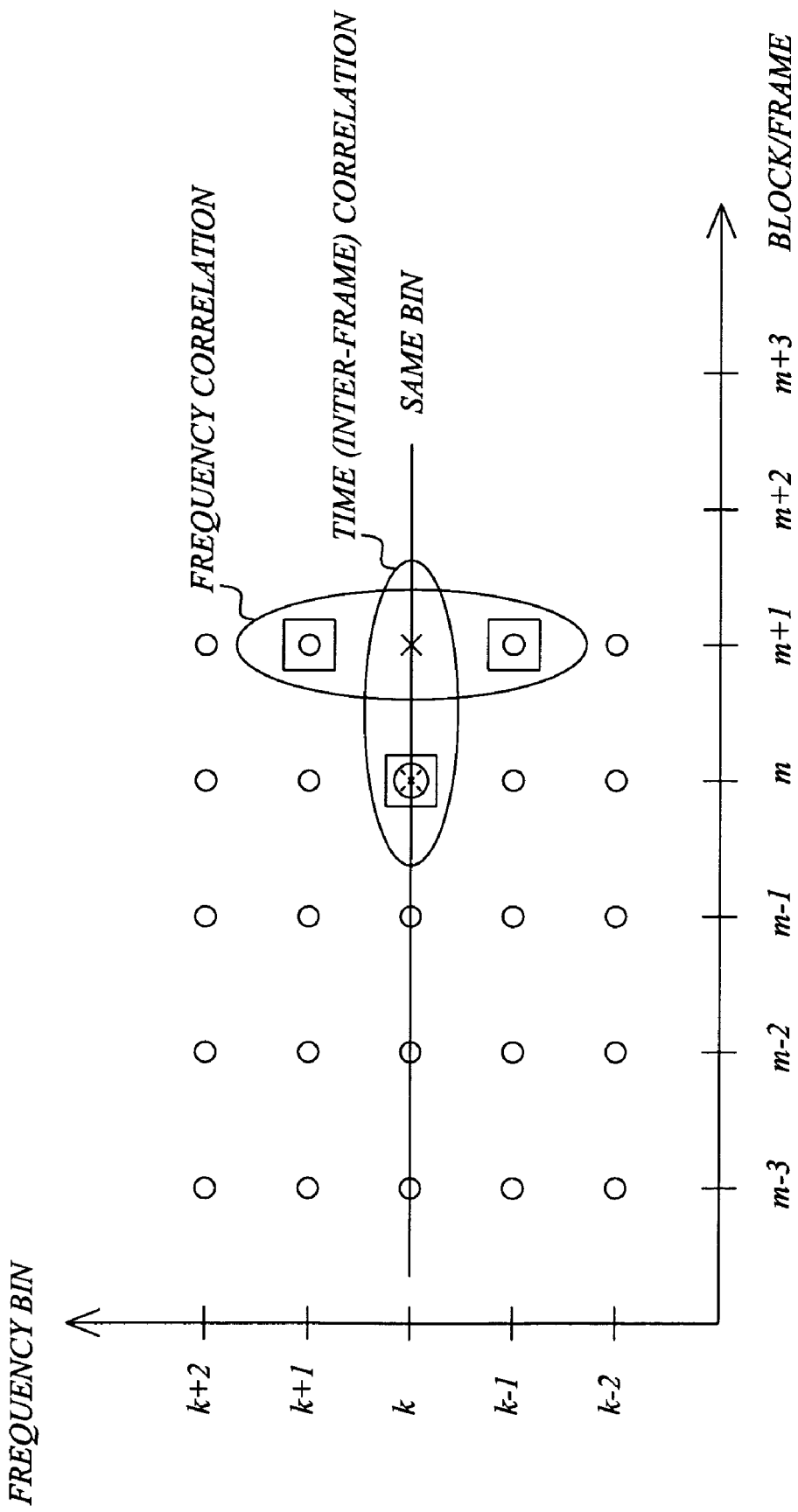

FIG. 2B illustrates an example of successive erroneous coefficients in the same bin. It is here assumed that the erroneous coefficient of frame m has been replaced by a new estimated replacement coefficient, for example as illustrated in FIG. 2A. In the next frame m+1, the erroneous coefficient is replaced based on the replacement coefficient (indicated by an encircled dashed cross) of the same frequency bin in the previous frame m together with for example the coefficients of two adjacent bins within the same frame as the considered erroneous coefficient. It may be desirable to be able to adjust the influence of estimated replacement coefficients compared to non-erroneous coefficients. This may be accomplished by providing weighting factors that may vary depending on whether the coefficients are non-erroneously transmitted coefficients or estimated replacement coefficients, and also depending on the "distance" in time (i.e. the number of frames) and/or frequency (i.e. the number of bins) from the considered erroneous coefficient.

Figure 2C:
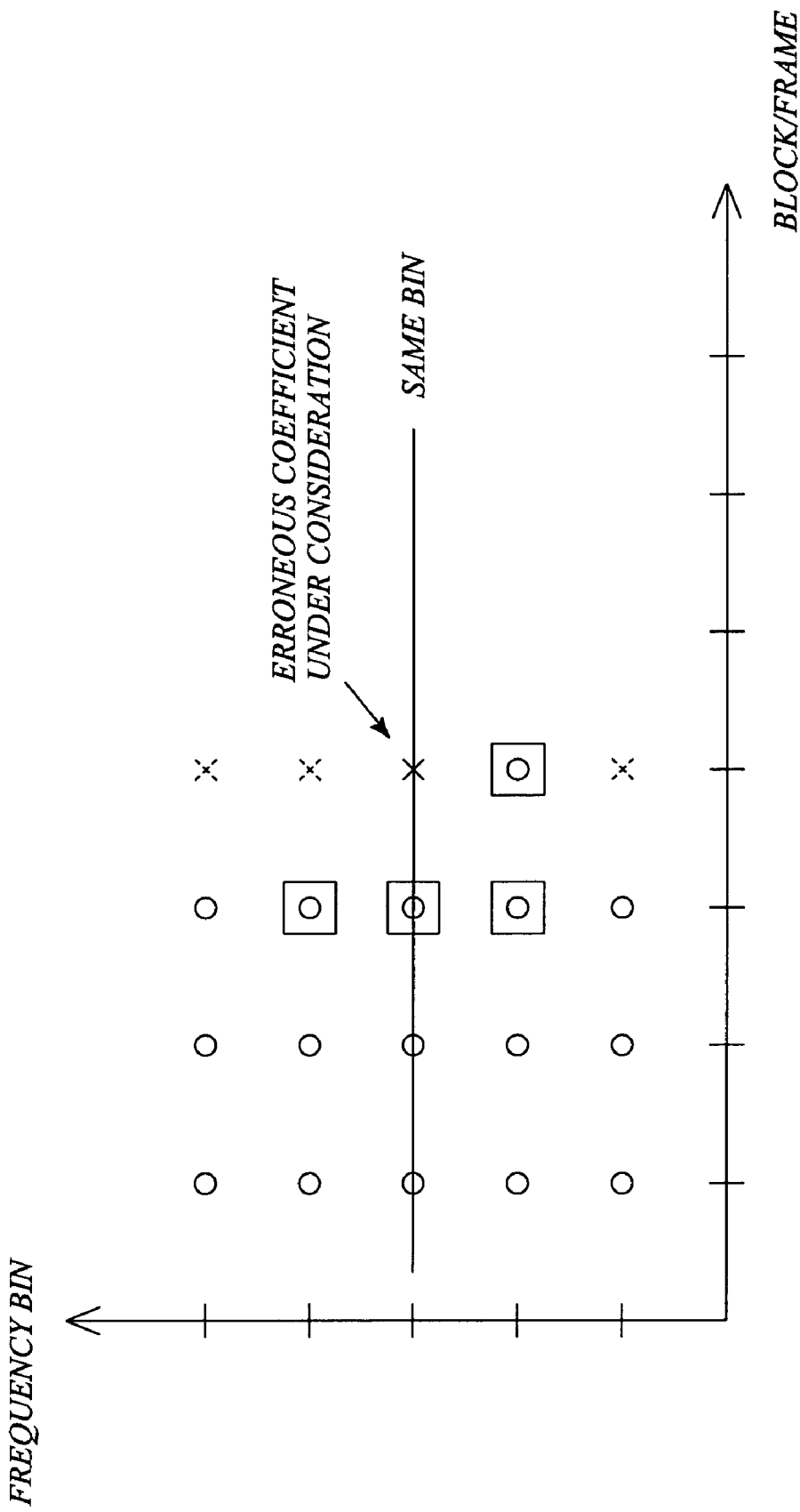
Figure 2D:
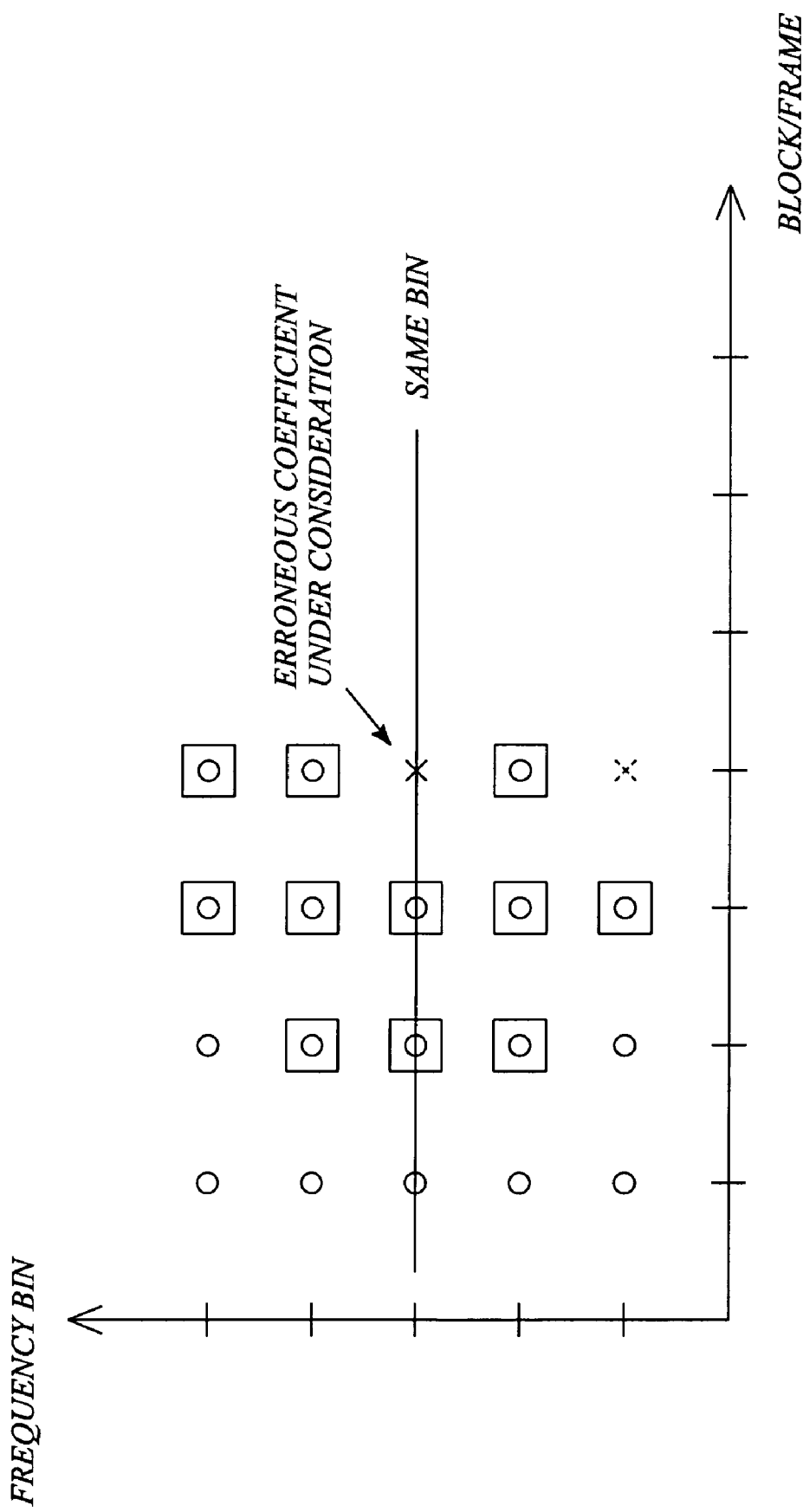

FIG. 2C illustrates an example when several of the coding coefficients in the current frame are erroneous. In this case, the non-erroneous coding coefficient in the current frame is used together with the previous coefficient of the same frequency bin as well as coefficients of other frequency bins in the previous frame. This process is normally repeated for each of the erroneous coefficients of the current frame until they are all replaced by new coefficients FIG. 2D illustrates an example where several coding coefficients of more than one previous frame are considered together with coefficients within the current frame.

Figure 2E:
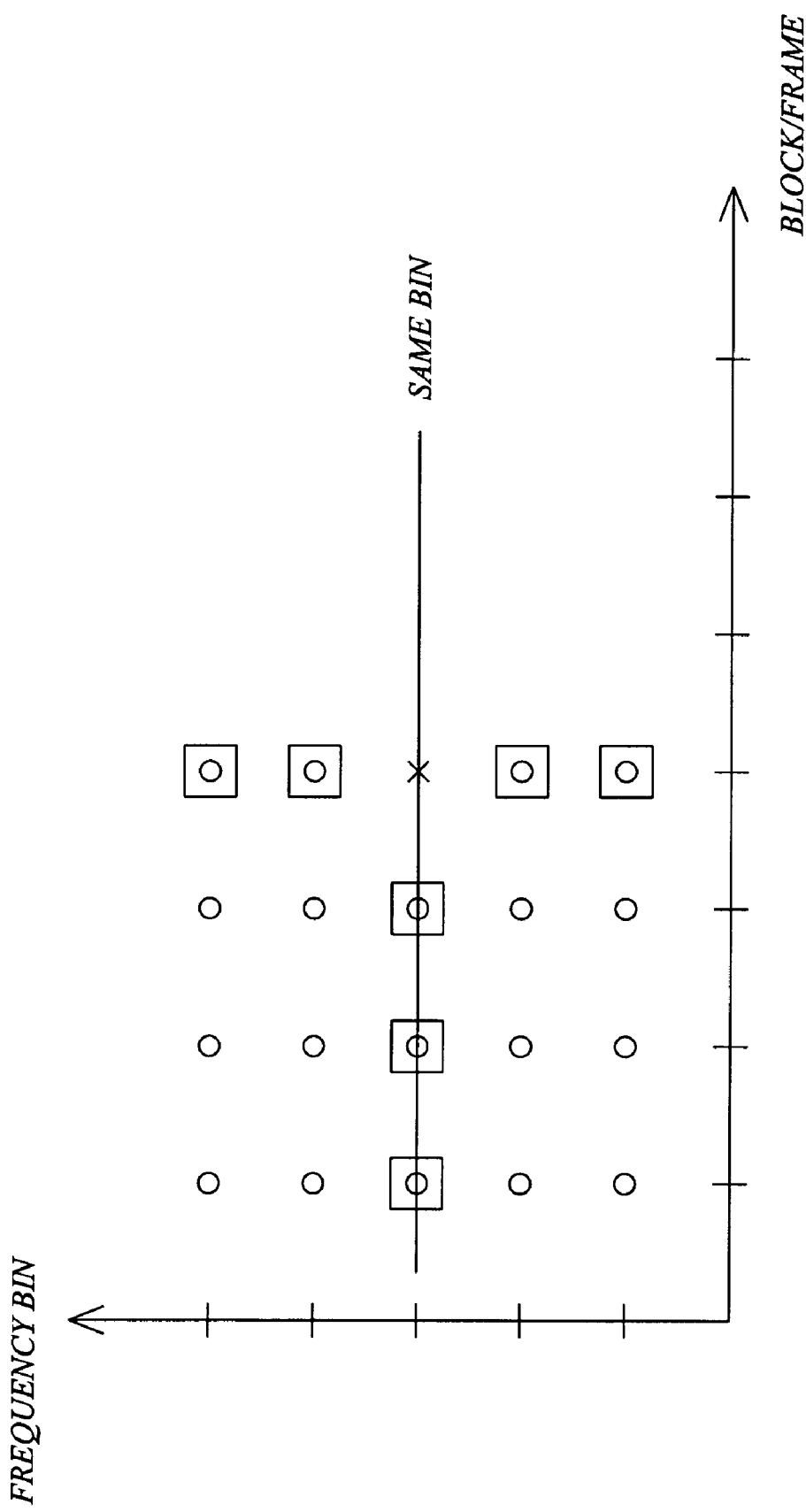

FIG. 2E illustrates yet another example where the coefficients of the same frequency bin from several previous frames are used together with the coefficients of several bins within the current frame.

Figure 2F:
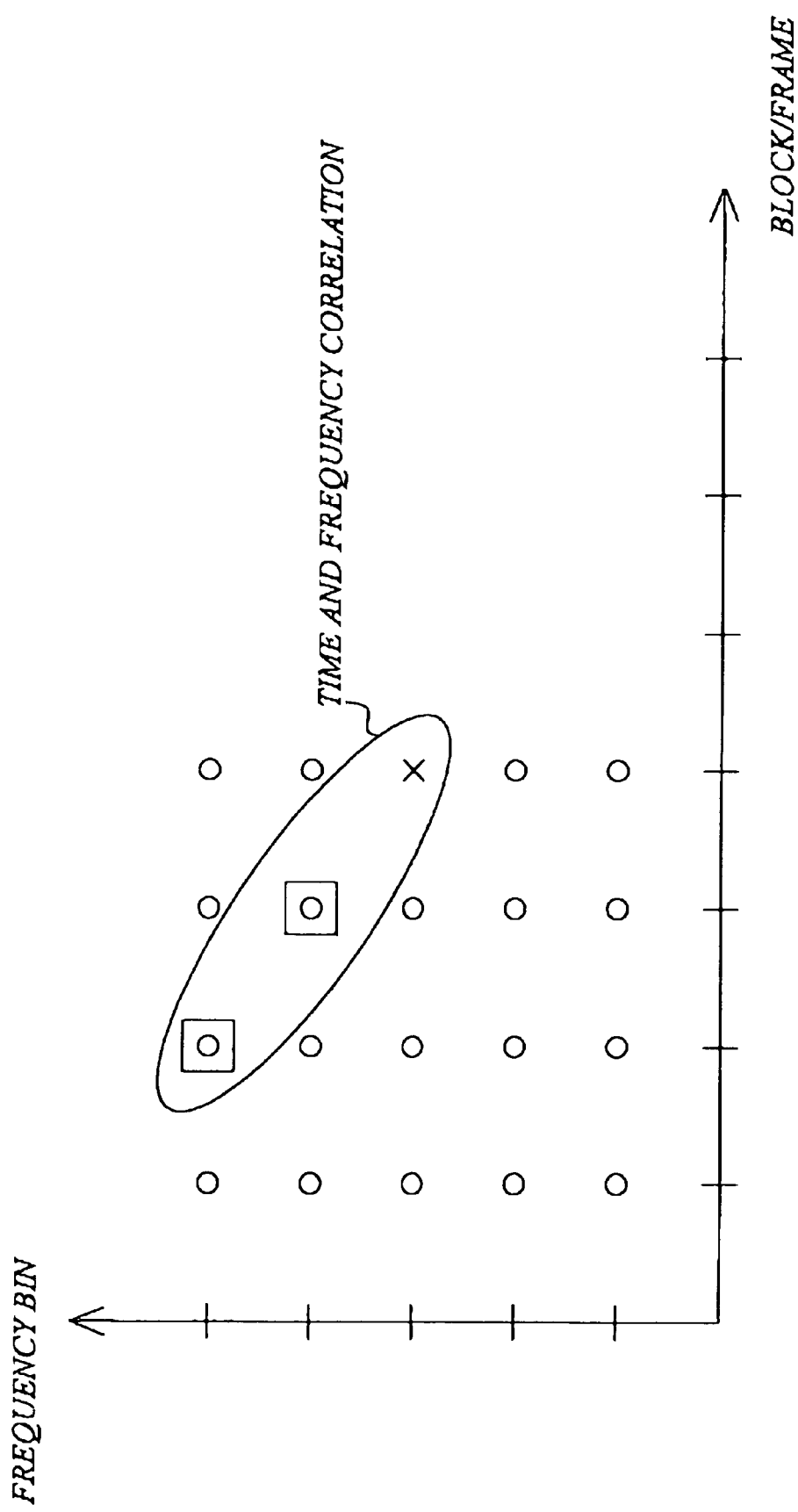

FIG. 2F illustrates an example with a diagonal correlation pattern.

Figure 2G:
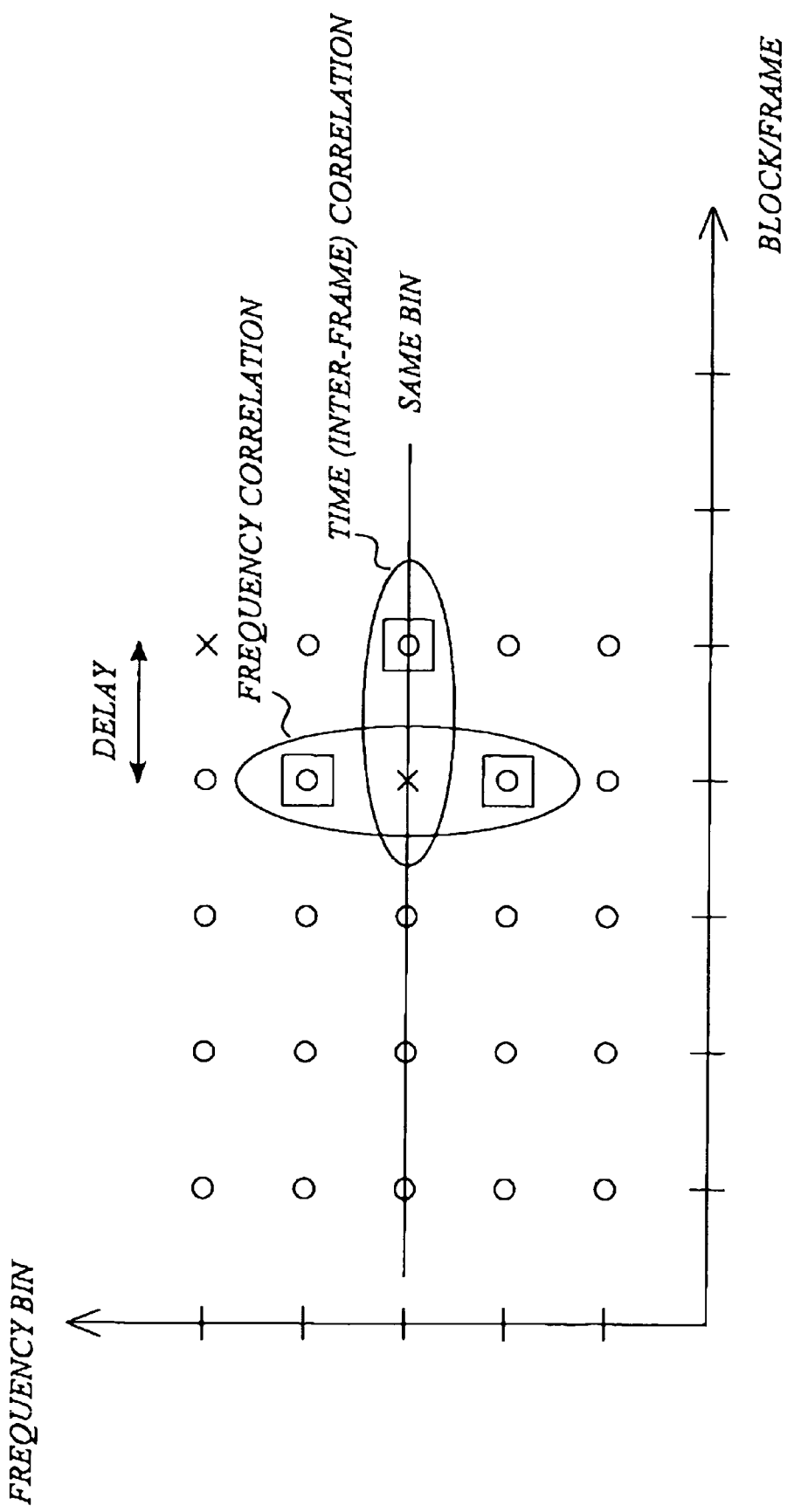

FIG. 2G illustrates a basic example where a coefficient of the same bin in a subsequent frame is used together with the coefficients of two adjacent bins within the same frame as the considered erroneous coefficient. This means that when an erroneous coefficient is detected within a given frame, the error concealment algorithm has to wait until the next frame in order to access the coefficient(s) of the subsequent frame. Apparently, this introduces a one-frame delay, and also assumes that the coefficient of the same bin in the subsequent frame is a non-erroneous/recovered coefficient.

Figure 2H:
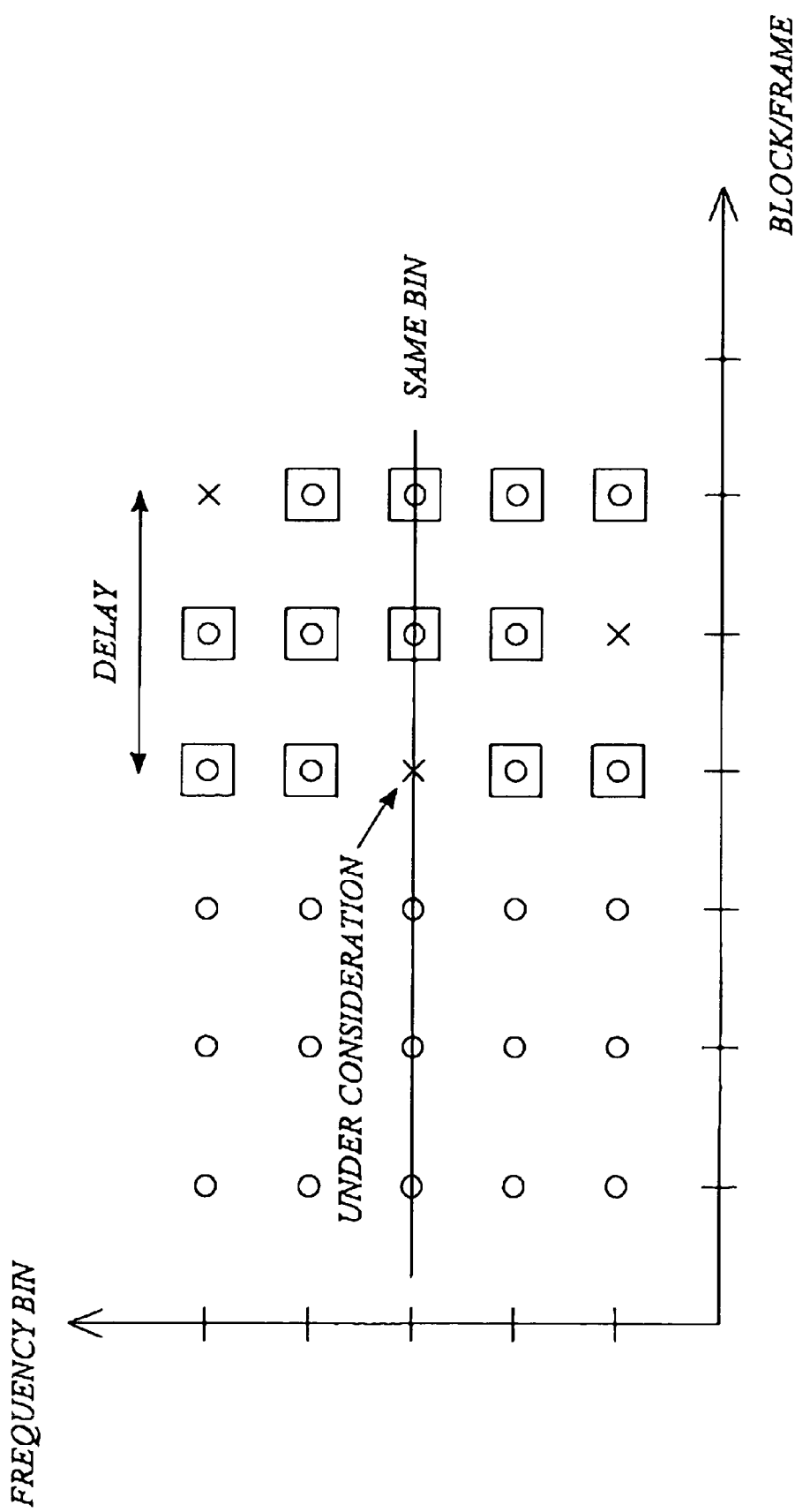

FIG. 2H illustrates another example with a delay of two frames, where a number of coefficients within the same frame as the considered erroneous coefficient are used together with as many non-erroneous/recovered coefficients as possible in the two directly following frames.

The invention will now be described in more detail, mainly with reference to transform and sub-band codecs. For more detailed information on sub-band and transform codecs including information on bit allocation, step sizes and decimation, reference is made to [9].

Figure 3:
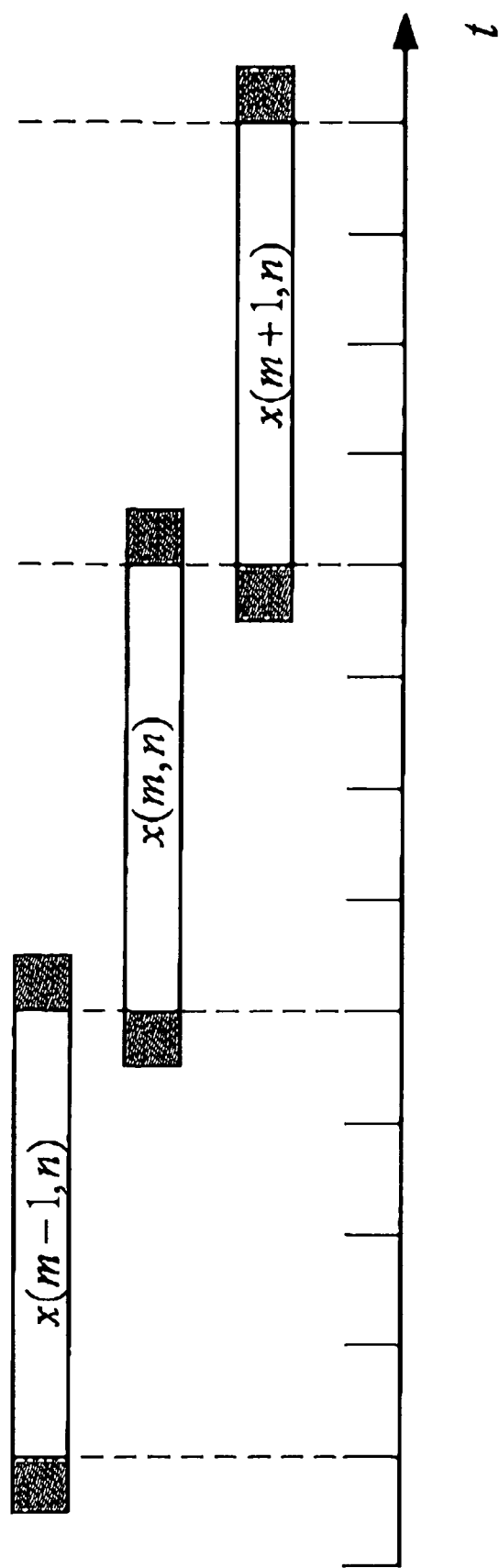
FIG. 3 is a schematic diagram of a possibly overlapping frame division of the time domain input samples.
Figure 4:
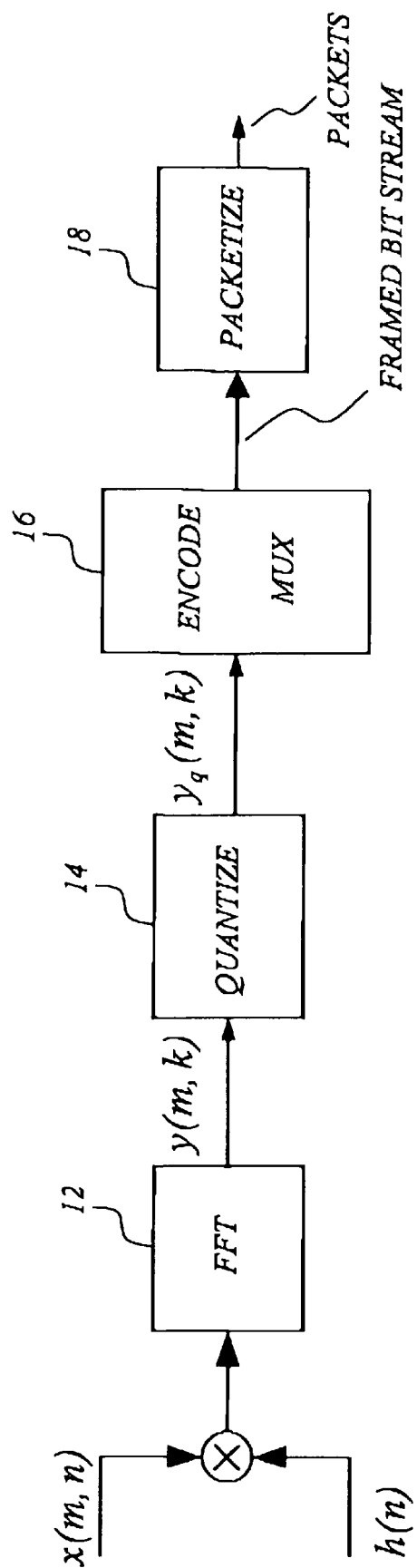
FIG. 4 is a schematic block diagram of an example of a basic transform-based coder.

As shown in FIG. 3, each analysis frame m may be composed of possibly overlapping blocks of the time domain input samples x(n). FIG. 4 is a schematic block diagram of an example of a simple transform codec. It can be seen that each block x(m,n) of the input signal is multiplied by a weighting function h(n) and then transformed in the frequency domain by the use of an FFT (Fast Fourier Transform) unit 12. Obviously, it should be understood that an FFT based encoder is just an example and that other types of transforms may be used, for example MDCT (Modified Discrete Cosine Transform). The obtained frequency-domain complex coefficients y(m,k), indexed by the bin number k, are quantized by the quantizer 14 into quantized complex coefficients $y_q(m,k)$. The quantized coefficients are then encoded and multiplexed by block 16 into a multiplexed information stream. The resulting framed bit stream is then packetized by block 18 and finally transmitted to the decoder on the receiving side.

Figure 5:
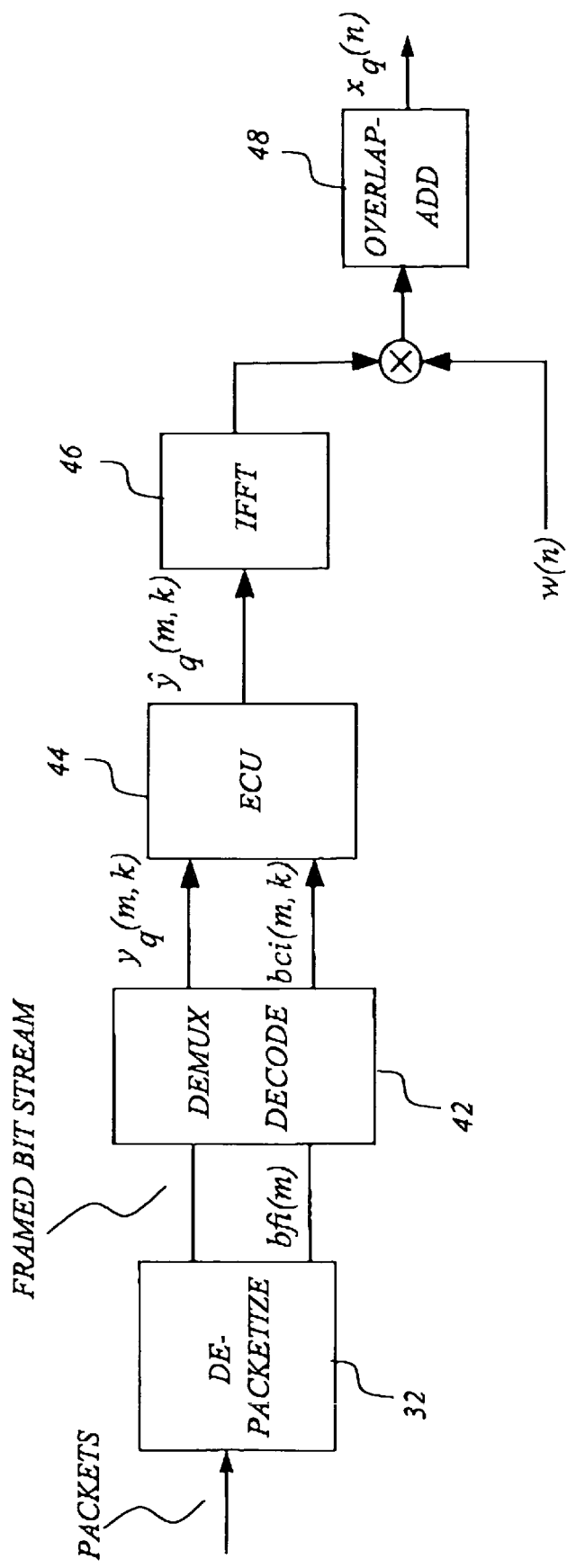
FIG. 5 is a schematic block diagram of an example of a basic transform-based decoder with error concealment.

As illustrated in FIG. 5, on the receiving side, the incoming bit stream is de-packetized by the block 32, which produces a framed bit stream as well as a bad frame indicator bfi(m) for each frame m. The bad frame indicator may be the result of a CRC check or detection of a lost packet. The framed bit stream and the corresponding bad frame indicator are forwarded to block 42, which performs demultiplexation and decoding to extract quantized complex transform coefficients. If no errors are detected, the quantized coefficients are simply inverse transformed in an IFFT (Inverse FFT) unit 46 to obtain a time domain signal, which is multiplied by a window function w(n) and overlap-added in the overlap-add unit 48 to restore a time domain decoded signal $x_q(n)$.

Depending on how the encoded data is multiplexed and packetized, data relative to one frame can be partially or entirely lost. This has the effect that at least parts of the spectral coefficients may be erroneous. Demultiplexation of the bad frame indicator bfi(m) will determine which coding coefficients that are erroneous, thus producing a bad coefficient indicator bci(m,k). In a preferred embodiment of the invention, the error concealment unit (ECU) 44 therefore receives an indication bci(m,k) of which spectral coefficients that are erroneous or missing, in addition to the extracted non-erroneous spectral coefficients $y_q(m,k)$. Based on the bad coefficient indicator bci(m,k), the error concealment unit 44 replaces those spectral coefficients that are indicated as erroneous or missing by new spectral coefficients.

Figure 6:
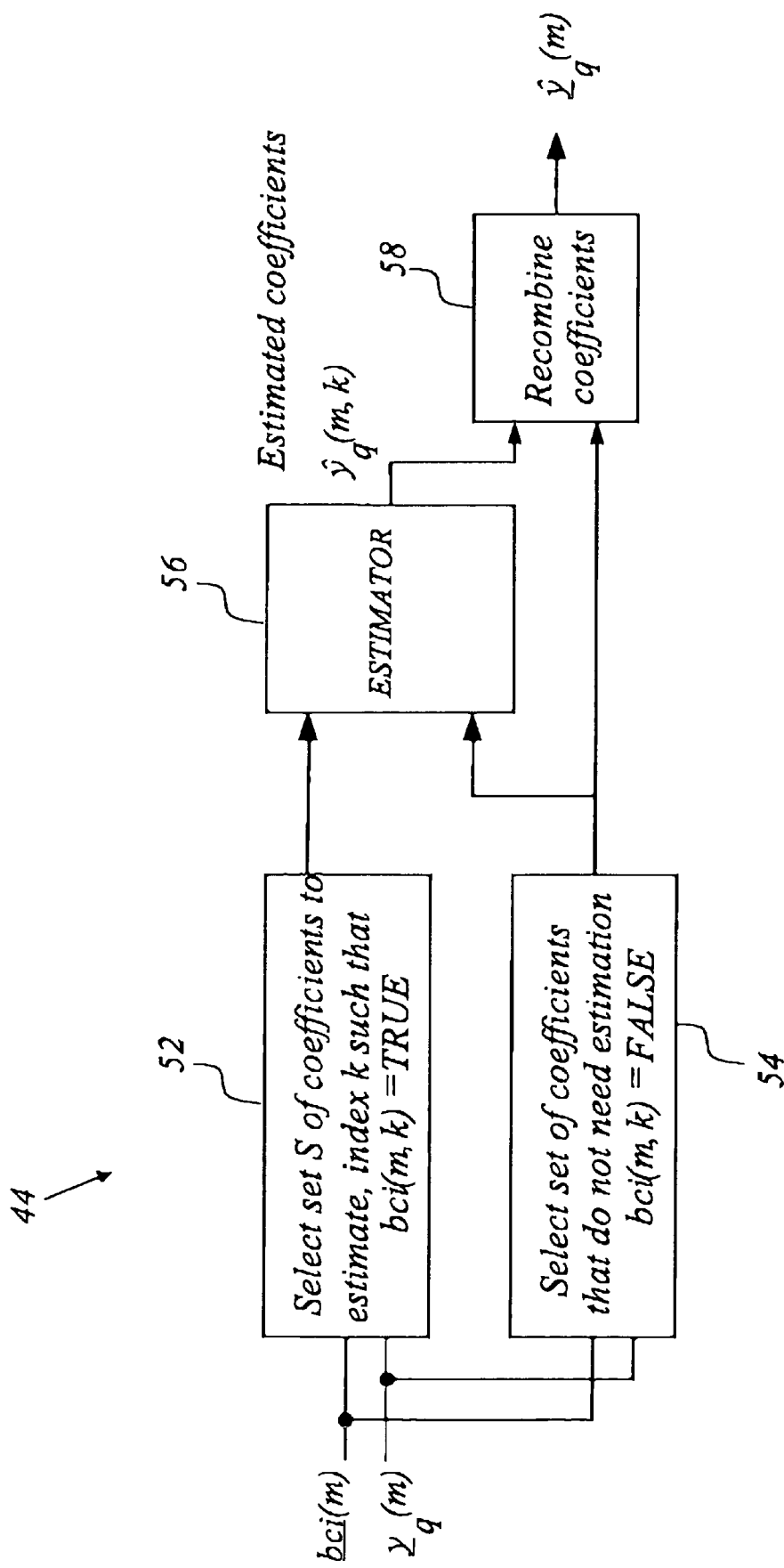
FIG. 6 is a schematic block diagram of an error concealment unit according to a preferred embodiment of the invention.

FIG. 6 is a schematic block diagram of an error concealment unit 44 according to a preferred embodiment of the invention. Based on the bad coefficient indicator of all frequency bins k in frame m, the logical units 52 and 54 operate to distinguish erroneous coefficients from non-erroneous coefficients. Preferably, the bad coefficient indicator bci(m,k) is Boolean. When there are no channel errors, the indicator is always set to FALSE, which means that the error concealment unit 44 simply outputs its input, i.e. $\hat{y}_q(m,k) = y_q(m,k)$. On the other hand, when a bad or missing coefficient is detected, the indicator is set to TRUE, which means that the coefficient is replaced by the output of the estimator 56. Sometimes the estimator needs to be always running in order to keep its internal memory state up-to-date, so it is only its output that is bridged as a replacement. The bci(m,k) therefore serves to select which spectral coefficients that need to be replaced by the spectral coefficient estimated by the estimator 56. In the following, the set of indices k of the erroneous spectral coefficients in frame m is denoted S={k, such that bci(m,k)=TRUE}. A recombination unit 58 receives and arranges the estimated replacement coefficients and non-erroneous coefficient of frame m for output.

For generality, the sub-band codec case will also be briefly illustrated with reference to FIGS. 7 and 8.

Figure 7:
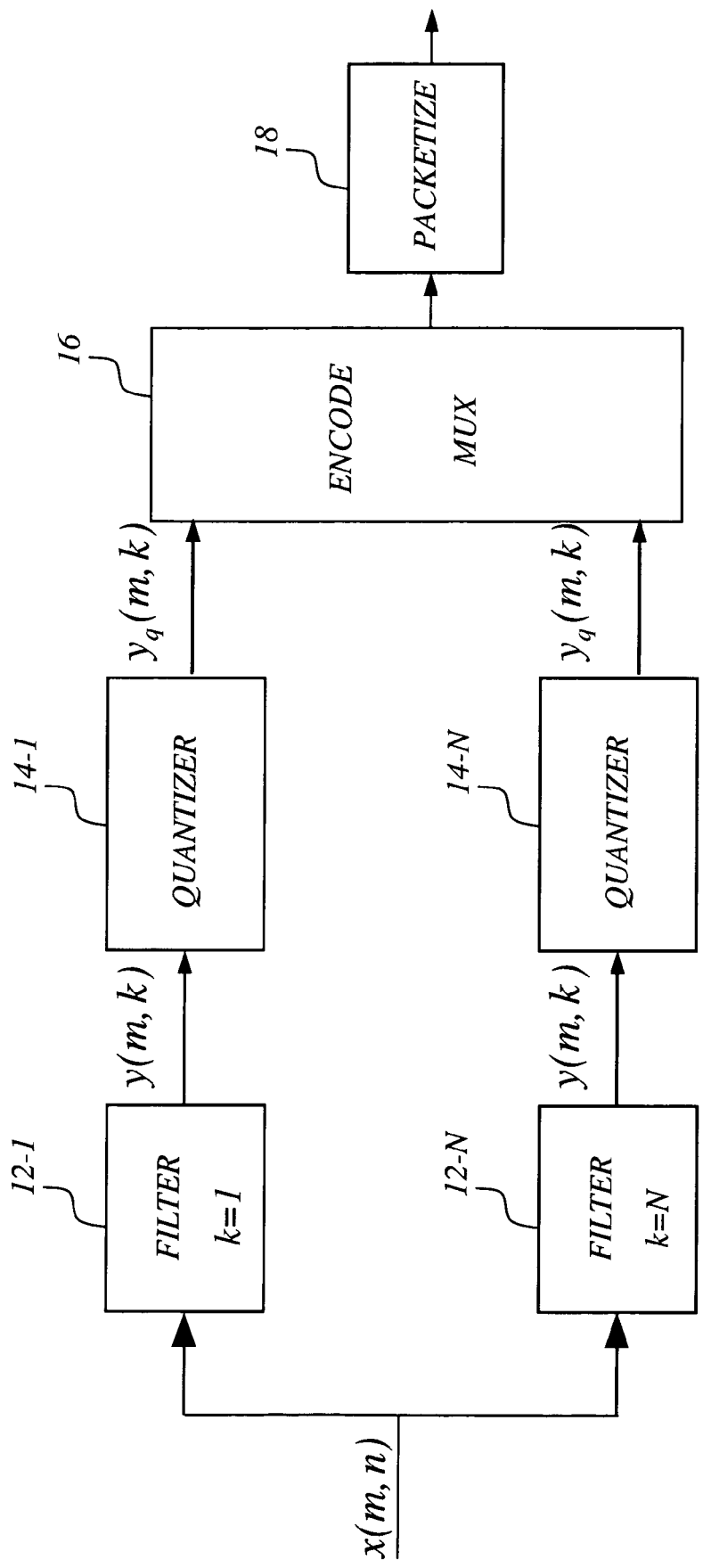
FIG. 7 is a schematic block diagram of an example of a basic sub-band coder.

FIG. 7 is a schematic block diagram of an example of a basic sub-band coder. In a sub-band coder, a bank of filters 12-1 to 12-N is employed to split the input signal into a number N of frequency bands, each of which is normally low-pass translated to zero frequency to generate a corresponding coding coefficient $y_q(m,k)$. The obtained coefficients y(m,k), indexed by the bin number k, are then separately quantized by a set of quantizers 14-1 to 14-N into quantized complex coefficients $y_q(m,k)$. The quantized coefficients are then encoded and multiplexed by block 16, and then packetized by block 18 before transmission to the decoder on the receiving side.

Figure 8:
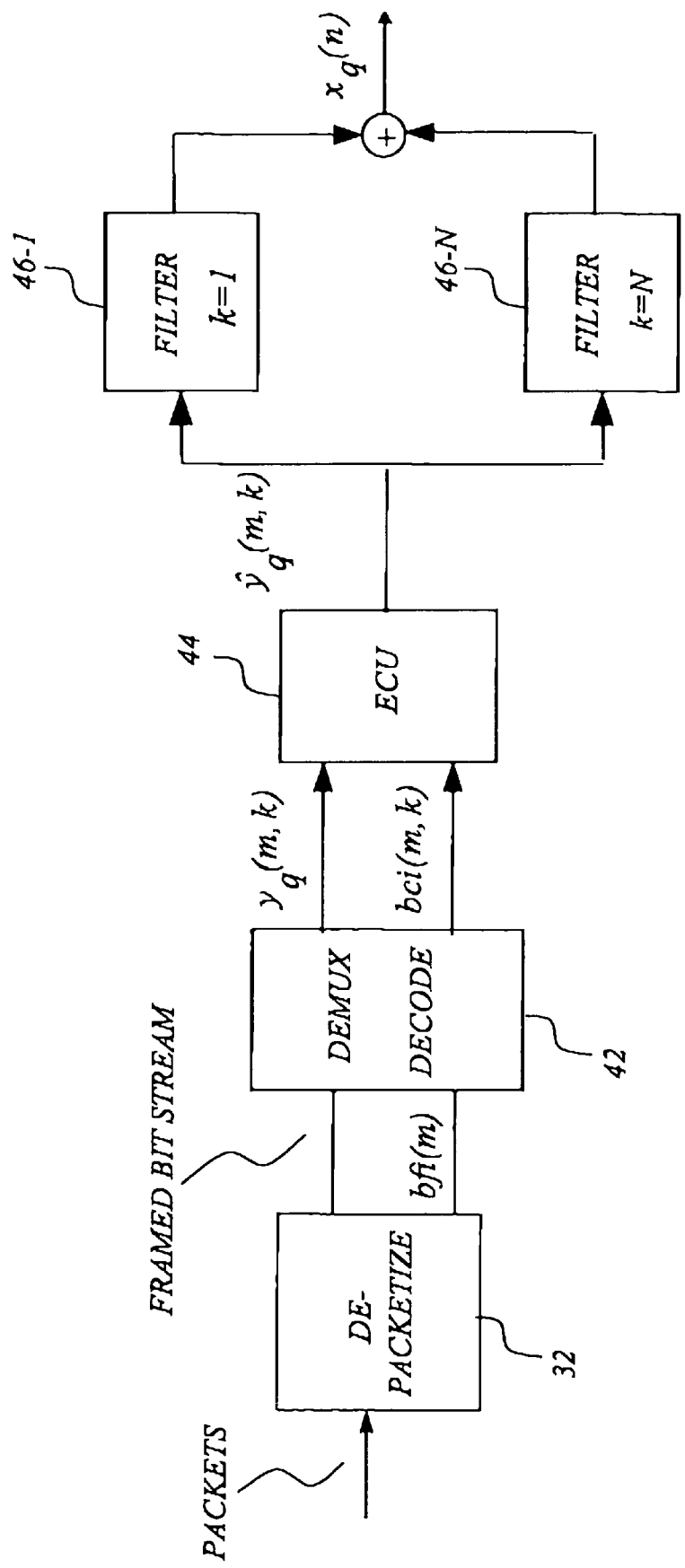
FIG. 8 is a schematic block diagram of an example of a basic sub-band decoder with error concealment.

As illustrated in FIG. 8, on the receiving side, the incoming bit stream is de-packetized by the block 32, which produces a framed bit stream as well as a bad frame indicator bfi(m) for each frame m. The framed bit stream and the bad frame indicator are forwarded to block 42, which performs demultiplexation and decoding to extract quantized complex transform coefficients and a bad coefficient indicator bci(m,k). If no errors are detected, the quantized coefficients are simply translated back to their original frequency positions by a bank of filters 46-1 to 46-N and summed together to give an approximation $x_q(n)$ of the original signal. Under adverse channel conditions, when errors occur during the transmission, the error concealment unit 44 receives an indication bci(m,k) of which spectral coefficients that are erroneous, in addition to the extracted non-erroneous coefficients $y_q(m,k)$. Based on the bad coefficient indicator, the error concealment unit 44 replaces those coefficients that are indicated as bad or missing by new spectral coefficients, similarly to what has been described above.

Without loss of generality, some examples of combined time and frequency correlation utilization will now be described for the case of complex coding coefficients. It should though be understood that some of the basic underlying principles for exploiting coefficient correlation in time as well as frequency described below may also be applied to single-valued coding coefficients. In addition, we mainly focus on implementations for real-time applications that require no or very small delays. Hence, only previous frames are considered for estimation of new coding coefficients in the following examples.

Amplitude and Phase Prediction

In this embodiment, amplitude and phase are preferably predicted separately and then combined. The amplitude and the phase of the spectrum are related to the spectral coefficients by the following relations:

$$Y_q(m,k) = \sqrt{\text{Re}(y_q(m,k))^2 + \text{Im}(y_q(m,k))^2}$$

$$\varphi_q(m,k) = \arctan(\text{Im}(y_q(m,k))/\text{Re}(y_q(m,k)))$$

The predictor then predicts the amplitude $\hat{Y}_q(m,k)$ and the phase $\hat{\varphi}_q(m,k)$ and then combines them to obtain the predicted spectral coefficient;

$$\hat{y}_q(m,k) = \hat{Y}_q(m,k)\cos(\hat{\varphi}_q(m,k)) + j\hat{Y}_q(m,k)\sin(\hat{\varphi}_q(m,k)).$$

Amplitude Prediction

Conventionally, the amplitude prediction is often based on simply repeating the previous bin amplitude:

$$\hat{Y}_q(m,k) = Y_q(m-1,k).$$

This has the drawback that if for example an audio signal has a decreasing magnitude, the prediction leads to overestimation which can be badly perceived.

A more elaborate scheme, proposed by the present invention, exploits redundancy in both time and frequency, which allows a better prediction of the spectral magnitude. For example, the predicted spectral magnitude can be written as:

$$\hat{Y}_q(m,k) = \gamma G(m) \cdot Y_q(m-1,k),$$

where G(m) is an adaptive gain obtained by matching the energy of non-erroneous/recovered spectral coefficients of the current frame with the corresponding spectral coefficients of the previous frame, the factor $\gamma$ is an attenuation factor, $0 < \gamma \leq 1$, e.g. $\gamma = 0.9$. An example of energy matching can be to compute the adaptive gain as:

$$G(m) = \sqrt{\frac{\sum_{k \notin S} Y_q(m,k)^2}{\sum_{k \notin S} Y_q(m-1,k)^2}}.$$

Other types of spectral energy matching measures may be used without departing from the basic idea of the invention.

In another embodiment, the gain G(m) can be estimated on several spectral bands by grouping the spectral coefficients into sub-bands and estimating the gain in each sub-band. The sub-band grouping can be on a uniform scale or a bark scale, which is motivated by psychoacoustics. The adaptive gain in sub-band l is therefore estimated by:

$$G(m,l) = \sqrt{\frac{\sum_{\substack{k \in \text{subband}(l) \\ k \notin S}} Y_q(m,k)^2}{\sum_{\substack{k \in \text{subband}(l) \\ k \notin S}} Y_q(m-1,k)^2}}.$$

The predicted amplitude of the spectral coefficients in frequency sub-band l is given by:

$$\hat{Y}_q(m,k) = G(m,l) \cdot Y_q(m-1,k), \ k \in \text{subband}(l).$$

The estimated gain on each spectral band greatly benefit from smoothing both in the time domain (smoothing in m) as well as in the frequency domain (smoothing in l) by the use of, for example, low pass filtering in the time and the frequency domain or a polynomial fit in the frequency domain and low pass filtering in the time domain.

The sub-band embodiment is especially useful if the spectral missing coefficients are uniformly spread over the frequency axis. In certain situations, the spectral coefficients of a previously assigned sub-band grouping may all be lost. In this case, it is possible to merge the neighboring sub-band groupings or determine the gain associated with the sub-band as the average of the gain estimated in the neighboring sub-bands. Another strategy involves re-using the previous gain, i.e. $G(m,l)=G(m-1,l)$, or a frequency domain filtered version, i.e.

$$G(m, l) = \sum_p f(l) \cdot G(m-1, l-p).$$

Other strategies may of course be used without departing from the basic idea.

For the case when all spectral coefficients are lost, then the adaptive gain matching may be estimated either by using the previous two frames, or by using the previous adaptive gain matching, i.e. $G(m,l)=G(m-1,l)$.

More sophisticated, but more complex, means may be used for the gain prediction. For instance, a linear adaptive gain predictor may be used. The prediction may then be formed by:

$$Y_q(m, k) = \sum_{\substack{p=1...P \\ l=-L...L}} A_{pl}(m, k) Y_q(m-p, k-l),$$

where the predictor coefficients $A_{pl}(m,k)$ are adaptively adjusted, for example in some least error sense such as the least mean square.

Phase Prediction

The phase prediction is more critical, since if the phase of the predicted spectral coefficients is far from the true one, a phase mismatch on the overlap sections leads to severe audible artifacts. In the article "Improved Phase Vocoder Time-Scale Modification of Audio" by Laroche and Dolson [10], they mention that in the context of time-stretching phase vocoders one of the main reasons for artifacts is the lack of phase coherence.

Preferably, the phase prediction technique proposed by the present invention uses redundancies of the information signal in both time and frequency. A particularly advantageous model is based on approximate group delay matching. This comes from the observation in audio applications that for a stationary single tone the derivative of the phase with respect to the frequency, i.e. the group delay, is approximately constant over time. This is justified in theory for a constant amplitude complex tone:

$$x(m,n)=A \cdot e^{j\omega_0 n + j\phi_u}$$

$$x(m+1,n)=A \cdot e^{j\omega_0 n + j\phi_u + j\omega_0 L}$$

where L is the amount of overlap.

The windowed DFT (Discrete Fourier Transform) of both signal sections is given by;

$$X(m,\omega)=AH(\omega-\omega_0)e^{j\phi_0}$$

$$X(m+1,\omega)=AH(\omega-\omega_0)e^{j\phi_0+j\omega_0 L}$$

and it is easily seen that the group delay of both signal sections is the same $$\frac{\partial \arg X(m, \omega)}{\partial \omega} = \frac{\partial \arg X(m+1, \omega)}{\partial \omega} = \frac{\partial \arg H(\omega - \omega_0)}{\partial \omega},$$

which shows that the group delay is constant and does not depend on m. This result can be shown to hold approximately for multiple tones, depending on how good is the window rejection band.

Therefore, estimating the derivative of the phase from the previous frame(s) allows the estimation of the missing spectral components phase by extrapolation.

A simple way of performing the phase prediction based on group delay matching is to first estimate the derivative of the phase in the previous frame. This can be done by using simple finite differences:

$$\Delta \phi(m-1,k)=\phi(m-1,k)-\phi(m-1,k-1).$$

Other ways of obtaining an estimate of the group delay may of course be used. The idea then is to approximately restore the same group delay for each missing spectral component. This can be achieved by computing the predicted phases such that they minimize an error function, for example:

$$\sum_k W(k) \cdot (\varphi(m, k) - \varphi(m, k-1) - \Delta\varphi(m-1, k))^2,$$

where the unkmown parameters are $\phi(m,k)$ such that $k \in S$, i.e. the phase of the lost spectral coefficients, and $W(k)$ are positive weighting coefficients.

It is advantageous that the weighting coefficients are set proportional to the magnitude of the spectrum of the previous frame, or the predicted magnitude of the current frame, or a smoothed spectral envelope. This allows to emphasize the importance of the spectral peaks and to filter out the bad estimates of the phase derivative introduced by noise in the spectral valleys.

In other words, the phase prediction is preferably based on estimating the group delay from at least one other (previous) frame, and determining the spectral phase of the erroneous coefficient such that the group delay associated with the erroneous coefficient gets as close as possible to the estimated group delay, according to some approximation criterion.

An example of a solution in the case of $W(k)=1$ is given. As shown in FIGS. 9A-B, the lost coefficients are between bin K and bin K+N.

The minimization of the error criterion leads to the following recursive solution for the extrapolated-predicted phase:

$$\hat{\phi}(m,k)=\hat{\phi}(m,k-1)+\Delta\phi(m-1,k)+\Delta\phi_c, k=K+1, \ldots, K+N-1,$$

where $$\Delta\phi_c=(1/N) \cdot (\phi(m,K+N)-\phi(m-1, K+N)-\phi(m,K)+\phi(m-1,K)).$$

In this solution, it is quite obvious that $\hat{\phi}(m,K)=\phi(m,K)$ is used to start the recursion.

For the case when all spectral coefficients are lost, then a secondary phase predictor is used to allow initialization of the above recursion.

More sophisticated, but more complex means may be used for the phase prediction without departing from the basic idea of group delay matching/conservation. For instance, by additional exploitation of time-domain redundancies with the group delay conservation.

Figure 10:
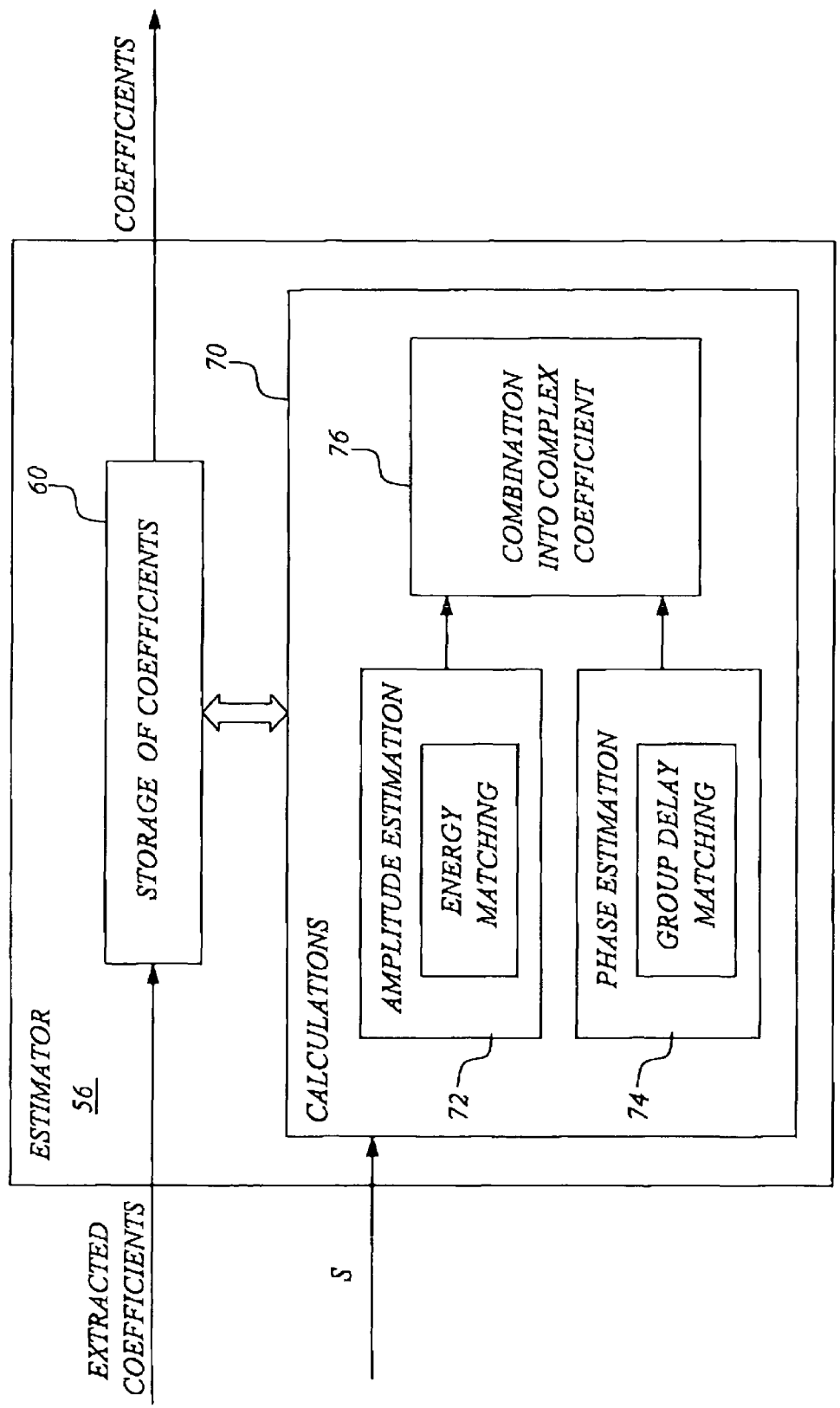
FIG. 10 is a schematic block diagram of an estimator for complex coefficients according to a preferred embodiment of the invention.

FIG. 10 is a schematic block diagram of an estimator for complex coefficients according to a preferred embodiment of the invention. The estimator 56 basically comprises a storage unit 60 for storing coding coefficients belonging to a selectable number of frames, and a unit 70 for performing the necessary calculations to estimate new replacement coefficients. The storage unit 60 receives the extracted coefficients of the current frame and stores these together with non-erroneous/recovered coding coefficients belonging to one previous frames. The calculation unit 70 receives information S on which coefficients to estimate, and calculates corresponding replacement coefficients based on the stored coefficients accessed from the storage unit 60. In a preferred embodiment of the invention, adapted for complex transform coefficients, the calculation unit 70 comprises an amplitude estimation unit 72 that operates based on the previously described energy matching principles, a phase estimation unit 74 that operates based on the previously described group delay matching principles, as well as a combination unit 76 for combination of the estimated phase and amplitude components into complex coefficients.

It should though be understood that the advanced phase and amplitude estimation techniques proposed by the invention can be used independently. For example, phase could be estimated based on group delay matching as indicated above, with a simpler estimate of amplitude. On the other hand, amplitude could be estimated based on spectral energy matching as indicated above, with a simpler estimate of phase.

Direct Coefficient Prediction

In this embodiment, complex spectral coefficients are predicted directly. The predictor output $\hat{y}_q(m,k)$ is preferably dependent on at least the previous spectral coefficient(s) of the same bin as well as previous and/or current spectral coefficients of other bins.

In general, this can be represented by a time-dependent adaptive predictor function $f_{m,k}$ such that:

$$\hat{y}_q(m,k) = f_{m,k}(y_q(m-1), \ldots, y_q(m-q), y(m,k_1), y(m,k_1), \ldots, y(m,k_p))$$

where $k_1, k_2, \ldots, k_p$ denote the indices of the non-erroneous spectral coefficients. The predictor function can, for instance, take the form of a linear predictor.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] S. J. Godsill, P. J. W. Rayner, "*Digital Audio Restoration*", Springer, 1998.

[2] J. J. K. O Ruanaidh, W. J. Fitzgerald, "*Numerical Bayesian Methods Applied to Signal Processing*", Springer 1998.

[3] R. Veldhuis "Restauration of lost samples in digital signals", Prentice Hall, 1990.

[4] J. Herre, E. Eberlein, "Error Concealment in the spectral domain", 93$^{rd}$ AES Convention, 1992 Oct., 1-4, preprint 3364.

[5] J. Herre, E. Eberlein, "Evaluation of concealment techniques for compressed digital audio", 94$^{th}$ AES Convention, 1993 Oct., 1-4, preprint 3364.

[6] U.S. Pat. No. 6,421,802-B1

[7] EP-0 574 288-B1

[8] U.S. Pat. No. 6,351,728-B1

[9] A. M. Kondoz, "Digital Speech: Coding For Low Bit Rate Communication", Wiley (1994), pp. 123-128.

[10] J. Laroche, M. Dolson, "Improved Phase Vocoder Time-Scale Modification of Audio", IEEE transactions on speech and audio processing, 323-332, Vol. 7, No 3, May 1999.

The invention claimed is:

1. A frequency-domain error concealment method for information represented, on a frame-by-frame basis, by coding coefficients of a number of frequency bins, wherein said method comprises the steps of:
   receiving information representative of an erroneous coding coefficient being detected for a certain frequency bin in a frame; and
   concealing said erroneous coding coefficient for said frequency bin in said frame by exploiting coding coefficient correlation in both time and frequency, wherein said step of concealing said erroneous coding coefficient comprises the steps of:
      estimating a new coding coefficient of said frequency bin in said frame at least partly based on at least one coding coefficient of at least one other frequency bin in said frame and at least one coding coefficient of the same frequency bin in at least one other frame; and
      replacing said erroneous coding coefficient by said new coding coefficient.

2. The frequency-domain error concealment method according to claim 1, wherein said erroneous coding coefficient is at least one of a partially erroneous coding coefficient and a totally lost coding coefficient.

3. The frequency-domain error concealment method according to claim 1, wherein said coding coefficients are quantized coding coefficients.

4. The frequency-domain error concealment method according to claim 1, wherein said new coding coefficient of said frequency bin is estimated also based on at least one coding coefficient of at least one other frequency bin in at least one other frame.

5. The frequency-domain error concealment method according to claim 1, wherein said step of estimating a new coding coefficient comprises the step of predicting a spectral phase component based on approximate group delay matching between frames, using a predetermined approximation criterion.

6. The frequency-domain error concealment method according to claim 5, wherein said step of predicting a spectral phase component comprises the steps of:
   estimating group delay from at least one other frame; and
   calculating the spectral phase by at least approximately matching the group delay associated with the new spectral component to the estimated group delay.

7. The frequency-domain error concealment method according to claim 6, wherein said step of calculating the spectral phase includes the step of calculating the spectral phase $\hat{\phi}_q(m,k)$ in frame m and frequency bin k based on the following recursive solution:

$$\hat{\phi}(m,k)=\hat{\phi}(m,k-1)+\Delta\phi(m-1,k)+\Delta\phi_c,$$
$$k=K+1,\ldots,K+N-1,$$

where:

$$\Delta\phi(m-1,k)=\phi(m-1,k)-\phi(m-1,k-1),$$

$$\Delta\phi_c=(1/N)\cdot(\phi(m,K+N)-\phi(m-1,K+N)-\phi(m,K)+\phi(m-1,K)),$$

and $$\phi(m,K)=\phi(m,K)$$

is used to start the recursion.

8. The frequency-domain error concealment method according to claim 1, wherein said step of estimating a new coding coefficient comprises the step of predicting a spectral amplitude component based on spectral energy matching between frames.

9. The frequency-domain error concealment method according to claim 8, wherein said step of predicting a spectral amplitude component comprises the steps of:
calculating a weighting factor by matching the energy of spectral coefficients of the same frame as the erroneous coding coefficient with the energy of corresponding spectral coefficients of at least one other frame; and
calculating the spectral amplitude based on the spectral amplitude of the same frequency bin of said at least one other frame and said weighting factor.

10. The frequency-domain error concealment method according to claim 1, wherein said coding coefficients are complex spectral transform coefficients.

11. The frequency-domain error concealment method according to claim 10, wherein a new complex spectral coding coefficient of a certain frequency bin is estimated by predicting spectral amplitude and phase separately and subsequently combining the predicted spectral amplitude and phase.

12. The frequency-domain error concealment method according to claim 11, wherein the spectral amplitude is predicted based on the spectral amplitude of the same frequency bin of at least one other frame and a weighting factor, said weighting factor being calculated by matching the energy of spectral coefficients of said frame with the energy of corresponding spectral coefficients of said at least one other frame.

13. The frequency-domain error concealment method according to claim 11, wherein the spectral phase is predicted by estimating group delay from at least two spectral phase components of at least one other frame, and calculating the spectral phase by at least approximately matching a group delay associated with the new spectral component to the estimated group delay.

14. The frequency-domain error concealment method according to claim 1, wherein said information includes at least one of audio, video, and image data.

15. A frequency-domain error concealment arrangement for information represented, on a frame-by-frame basis, by coding coefficients of a number of frequency bins, wherein the arrangement comprises electronic circuitry configure to:
receive information representative of an erroneous coding coefficient being detected for a certain frequency bin in a frame, and
conceal said erroneous coding coefficient for said frequency bin in said frame based on coding coefficient correlation in both time and frequency by estimating a new coding coefficient of said frequency bin in said frame at least partly based on at least one coding coefficient of at least one other frequency bin in said frame and at least one coding coefficient of the same frequency bin in at least one other frame and replacing said erroneous coding coefficient by said new coding coefficient.

16. The frequency-domain error concealment arrangement according to claim 15, wherein the erroneous coding coefficient is at least one of a partially erroneous coding coefficient and a totally lost coding coefficient.

17. The frequency-domain error concealment arrangement according to claim 15, wherein the electronic circuitry is configured to estimate the new coding coefficient of the frequency bin also based on at least one coding coefficient of at least one other frequency bin in at least one other frame.

18. The frequency-domain error concealment arrangement according to claim 15, wherein the electronic circuitry is configured to predict a spectral phase component based on approximate group delay matching between frames using a predetermined approximation criterion.

19. The frequency-domain error concealment arrangement according to claim 18, wherein the electronic circuitry is configured to:
estimate group delay from at least one other frame; and
calculate the spectral phase by at least approximately matching the group delay associated with the new spectral component to the estimated group delay.

20. The frequency-domain error concealment arrangement according to claim 15, wherein said means for estimating a new coding coefficient comprises means for predicting a spectral amplitude component based on spectral energy matching between frames.

21. The frequency-domain error concealment arrangement according to claim 20, wherein the electronic circuitry is configured to:
calculate a weighting factor by matching the energy of spectral coefficients of the same frame as the erroneous coding coefficient with the energy of corresponding spectral coefficients of at least one other frame; and
calculate the spectral amplitude based on the spectral amplitude of the same frequency bin of said at least one other frame and said weighting factor.

22. The frequency-domain error concealment arrangement according to claim 15, wherein said coding coefficients are complex spectral transform coefficients.

23. The frequency-domain error concealment arrangement according to claim 22, wherein the electronic circuitry is configured to estimate a new complex spectral coding coefficient of a given frequency bin by predicting spectral amplitude and phase separately and subsequently combining the predicted spectral amplitude and phase.

24. The frequency-domain error concealment arrangement according to claim 23, wherein the electronic circuitry is configured to:
predict the spectral amplitude based on the spectral amplitude of the same frequency bin of at least one other frame and a weighting factor, and
calculate the weighting factor by matching the energy of spectral coefficients of said frame with the energy of corresponding spectral coefficients of said at least one other frame.

25. The frequency-domain error concealment arrangement according to claim 23, wherein the electronic circuitry is configured to predict the spectral phase by estimating group delay from at least two spectral phase components of at least one other frame and calculating the spectral phase by at least approximately matching a group delay associated with the new component to the estimated group delay.

26. The frequency-domain error concealment arrangement according to claim 15, wherein said information includes at least one of audio, video, and image data.

27. A decoder having a frequency-domain error concealment arrangement for information represented, on a frame-by-frame basis, by coding coefficients of a number of frequency bins, wherein said frequency-domain error concealment arrangement comprises:

means for receiving information representative of an erroneous coding coefficient being detected for a certain frequency bin in a frame; and means for concealing said erroneous coding coefficient for said frequency bin in said frame based on coding coefficient correlation in both time and frequency, wherein said means for concealing said erroneous coding coefficient comprises:

means for estimating a new coding coefficient of said frequency bin in said frame at least partly based on at least one coding coefficient of at least one other frequency bin in said frame and at least one coding coefficient of the same frequency bin in at least one other frame; and means for replacing said erroneous coding coefficient by said new coding coefficient.

28. A receiver having a frequency-domain error concealment arrangement for information represented, on a frame-by-frame basis, by coding coefficients of a number of frequency bins, wherein said frequency-domain error concealment arrangement comprises:

means for receiving information representative of an erroneous coding coefficient being detected for a certain frequency bin in a frame; and means for concealing said erroneous coding coefficient for said frequency bin in said frame based on coding coefficient correlation in both time and frequency, wherein said means for concealing said erroneous coding coefficient comprises:

means for estimating a new coding coefficient of said frequency bin in said frame at least partly based on at least one coding coefficient of at least one other frequency bin in said frame and at least one coding coefficient of the same frequency bin in at least one other frame; and means for replacing said erroneous coding coefficient by said new coding coefficient.

* * * * *

UNITED STATES PATENT AND TRADEMARK OFFICE
CERTIFICATE OF CORRECTION

PATENT NO. : 7,356,748 B2
APPLICATION NO. : 11/011780
DATED : April 8, 2008
INVENTOR(S) : Taleb It is certified that error appears in the above-identified patent and that said Letters Patent is hereby corrected as shown below:

In the Specification

In Column 4, Line 33, delete "tune" and insert -- time --, therefor.

In Column 11, Lines 33-34, delete " $Y_q(m,k) = \sum_{p=1...P} l=1...L$ " and insert -- $\hat{Y}_q(m,k) = \sum_{p=1...P} l=1...L$ --, therefor.

In Column 11, Line 60, delete " $A \cdot e^{j\omega_0 n + j\phi_u}$ " and insert -- $A \cdot e^{j\omega_0 n + j\phi_u}$ --, therefor.

In Column 11, Line 62, delete " $A \cdot e^{j\omega_0 n + j\phi_u + j\omega_0 L}$ " and insert -- $A \cdot e^{j\omega_0 n + j\phi_u + j\omega_0 L}$ --, therefor.

In Column 13, Line 18, after "one" insert -- or more --, therefor.

In the Claims

In Column 15, Line 14, in Claim 7, delete " $\phi(m,K) = \phi(m,K)$ " and insert -- $\tilde{\phi}(m,K) = \phi(m,K)$ --, therefor.

Signed and Sealed this
Third Day of September, 2013

Teresa Stanek Rea
*Acting Director of the United States Patent and Trademark Office*